(12) United States Patent
Skotnikov et al.

(10) Patent No.: US 6,311,795 B1
(45) Date of Patent: Nov. 6, 2001

(54) WORK VEHICLE STEERING AND SUSPENSION SYSTEM

(75) Inventors: Andrey V. Skotnikov, Burr Ridge; William L. Schubert, Downers Grove, both of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/562,199

(22) Filed: May 2, 2000

(51) Int. Cl.$^7$ .................................................. B62D 51/06
(52) U.S. Cl. ........................ 180/8.3; 180/252; 280/6.154
(58) Field of Search .................. 280/5.5, 5.514, 280/6.15, 6.154, 6.157, 5.502, 5.504, 5.505, 5.506, 5.507, 5.508, 5.509, 5.513, 6.16, 124.104, 124.106, 6.158, 124.159; 180/252, 264, 266, 209, 8.3; 239/161

(56) References Cited

U.S. PATENT DOCUMENTS

| | | | |
|---|---|---|---|
| 2,682,153 | * 6/1954 | Fink, Sr. ................................ | 404/127 |
| 2,726,630 | * 12/1955 | Dickerson ............................. | 118/235 |
| 3,306,390 | * 2/1967 | Jamme ................................... | 180/209 |
| 3,792,745 | * 2/1974 | Files ...................................... | 180/9.46 |
| 4,241,803 | * 12/1980 | Lauber .................................. | 180/8.1 |
| 4,395,191 | * 7/1983 | Kaiser ................................... | 414/694 |
| 4,558,758 | * 12/1985 | Littman et al. ........................ | 180/8.1 |
| 4,779,691 | * 10/1988 | Werdner ................................ | 180/8.3 |
| 4,977,971 | * 12/1990 | Crane, III et al. .................... | 180/8.3 |
| 5,384,706 | * 1/1995 | Uchiyama et al. ............. | 364/424.05 |
| 5,580,089 | * 12/1996 | Kolka .................................... | 280/772 |
| 5,755,382 | 5/1998 | Skotinkov ............................. | 239/161 |
| 6,131,919 | * 10/2000 | Lee et al. ........................... | 280/6.154 |
| 6,145,859 | * 11/2000 | Alherr et al. ................. | 280/124.159 |
| 6,208,920 | * 3/2001 | Izawa et al. ............................ | 701/36 |

* cited by examiner

*Primary Examiner*—Brian L. Johnson
*Assistant Examiner*—Daniel Yeagley
(74) *Attorney, Agent, or Firm*—Foley & Lardner

(57) ABSTRACT

A work vehicle steering system for a work vehicle having a frame, a plurality of wheels, and a coupling assembly coupled to at least one of the wheels is provided. The coupling assembly includes first, second, and third rotatable assemblies. The first rotatable assembly is coupled to the frame and is configured to rotate on a first axis. The second rotatable assembly is coupled to the first rotatable assembly and is configured to rotate on a second axis. The third rotatable assembly is coupled between the second rotatable assembly and the wheel and is configured to rotate on a third axis. The coupling assembly provides the wheel with three degrees of movement.

20 Claims, 10 Drawing Sheets

WORK VEHICLE STEERING AND SUSPENSION SYSTEM

FIELD OF THE INVENTION

The present invention relates generally to the field of off-road work vehicles, such as agricultural and construction vehicles, and, more particularly, to a work vehicle steering system for off-road work vehicles.

BACKGROUND OF THE INVENTION

Steering and suspension systems for work vehicles (e.g., tractors, sprayers, etc.) have been developed in some arrangements in the art. Typically a plurality of wheels are provided which can turn in two-wheel steering, four-wheel steering, or crab steering configurations. However, the wheels of such systems have a limited range of movement—typically about ninety degrees. Some work vehicle maneuvers require greater steering flexibility. For example, while moving throughout the field, the operator of a work vehicle must be careful to avoid damaging or crushing crops. Sprayers, in particular, require a high degree of maneuverability since they must travel over crops to provide chemicals to the agricultural field.

Suspension systems, too, are integral in determining the productivity of work vehicles. One way to increase productivity in agriculture is to increase the speed of the agriculture vehicle. The necessity of low speed operation arises from inefficient design of the suspension, the parameters of which cannot be adjusted to a changing terrain, roughness of a field, or weight of the sprayer or tractor. Thus, increasing the speed of existing agricultural vehicles results in a decrease in the quality of vehicle operation and operator comfort due to increased vibration.

Another limitation of prior steering and suspension systems is that, at certain speeds, the work vehicle begins to resonate. Since the wheel width and wheel base of most work vehicles are fixed, this resonance cannot be compensated for or reduced. Therefore, the operator must slow down the speed of the work vehicle, which negatively impacts productivity.

Accordingly, what is needed is an improved steering system that has greater flexibility and is still rugged enough to handle rough, off-road terrain. In an agricultural sprayer, such a new system would allow a more efficient and direct application of products (e.g., water, fertilizer, herbicides, insecticides, etc.) to a field. Further what is needed is an improved suspension system having operator-adjustable and/or terrain-specific parameters. Further still, what is needed is an improved suspension system that would allow the operator to vary the clearance between the chassis and the ground (i.e., crop clearance).

SUMMARY OF THE INVENTION

According to an exemplary embodiment, a work vehicle steering system for a work vehicle including a frame, a plurality of wheels, and a coupling assembly coupled to at least one of the wheels is provided. The coupling assembly includes first, second, and third rotatable assemblies. The first rotatable assembly is coupled to the frame and is configured to rotate on a first axis. The second rotatable assembly is coupled to the first rotatable assembly and is configured to rotate on a second axis. The third rotatable assembly is coupled between the second rotatable assembly and the wheel and is configured to rotate on a third axis. The coupling assembly provides the wheel with three degrees of movement.

According to another exemplary embodiment, a work vehicle steering system is provided for a work vehicle including a frame, a plurality of wheels, and a coupling means coupled to each of the wheels. The coupling means each include a first means coupled to the frame for rotating on a first axis, a second means coupled to the first means for rotating on a second axis, and a third means coupled between the second means and the wheel for rotating on a third axis. The coupling means provides the wheel with three degrees of movement.

According to yet another exemplary embodiment, a work vehicle steering system is provided for a work vehicle including a frame and a plurality of wheels. The system includes a coupling assembly configured to couple a first of the wheels to the frame. The coupling assembly has a first assembly configured to turn the wheel, a lever coupled to the first assembly, and a second assembly coupled to the lever and configured to swing the lever along an arc.

DETAILED DESCRIPTION OF THE PREFERRED EMBODIMENTS

Figure 1:
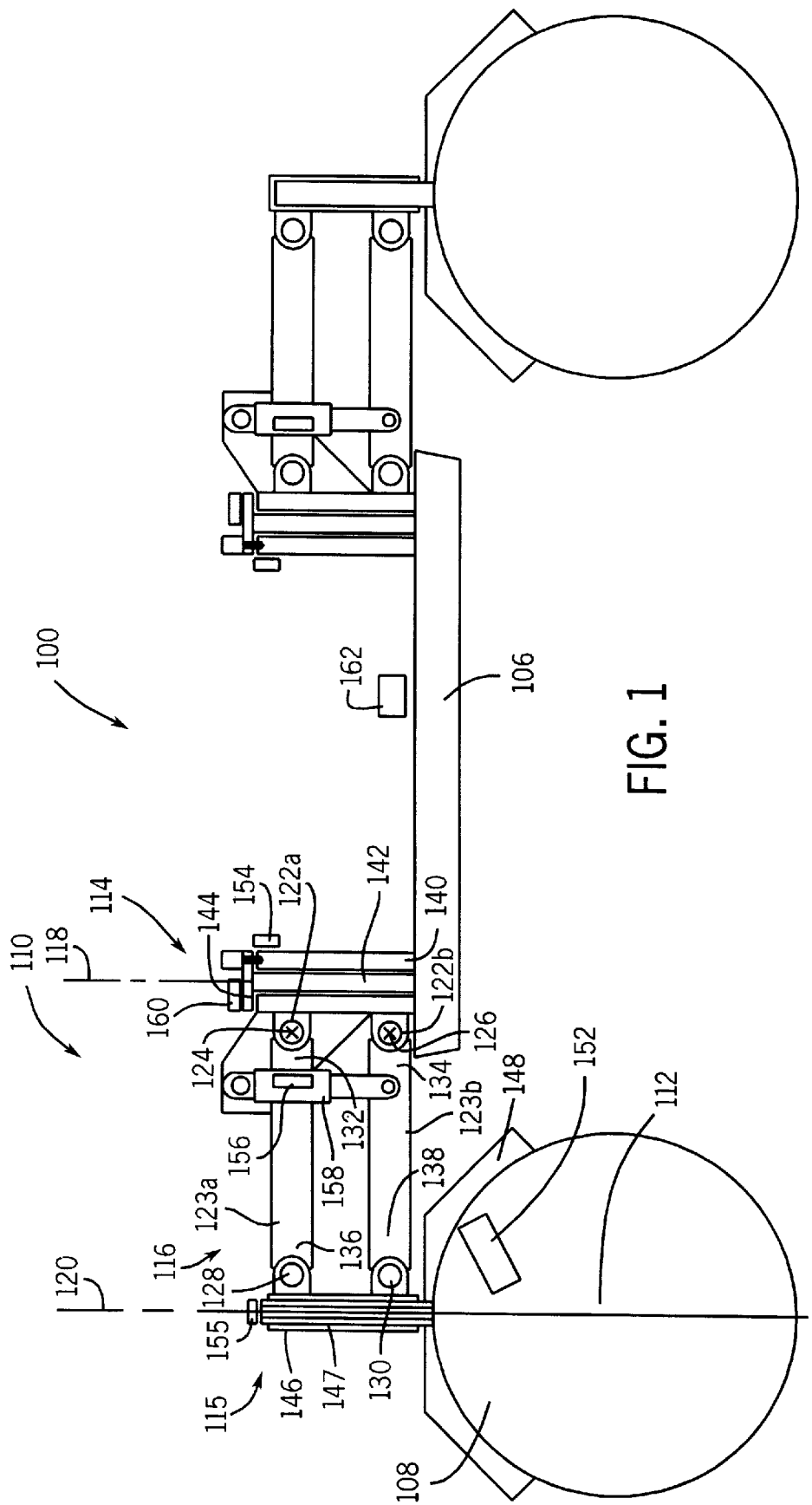
FIG. 1 is aside view of a chassis of a work vehicle having a steering and suspension system according to an exemplary embodiment.
Figure 2:
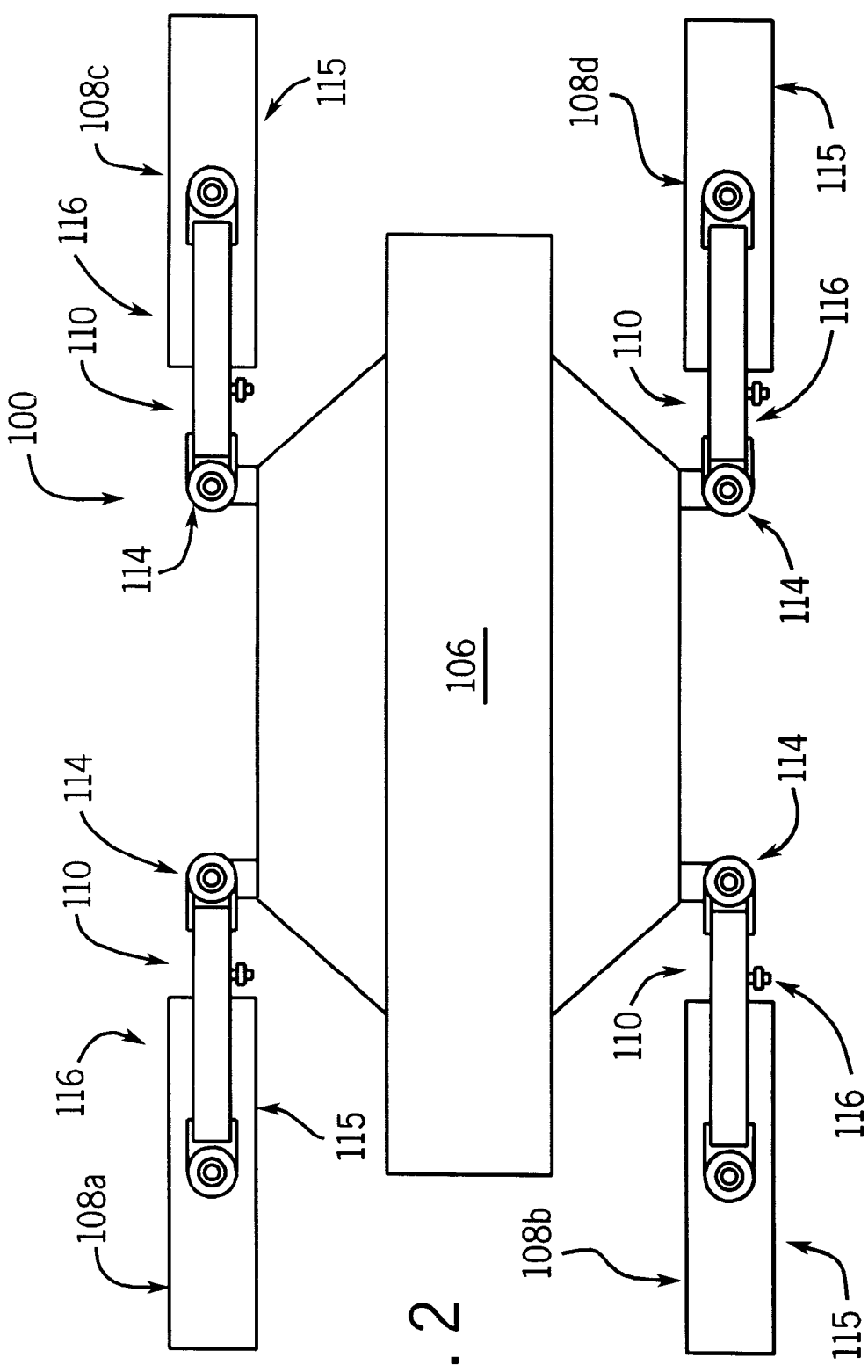
FIG. 2 is a top plan view of the work vehicle of FIG. 1.
Figure 3:
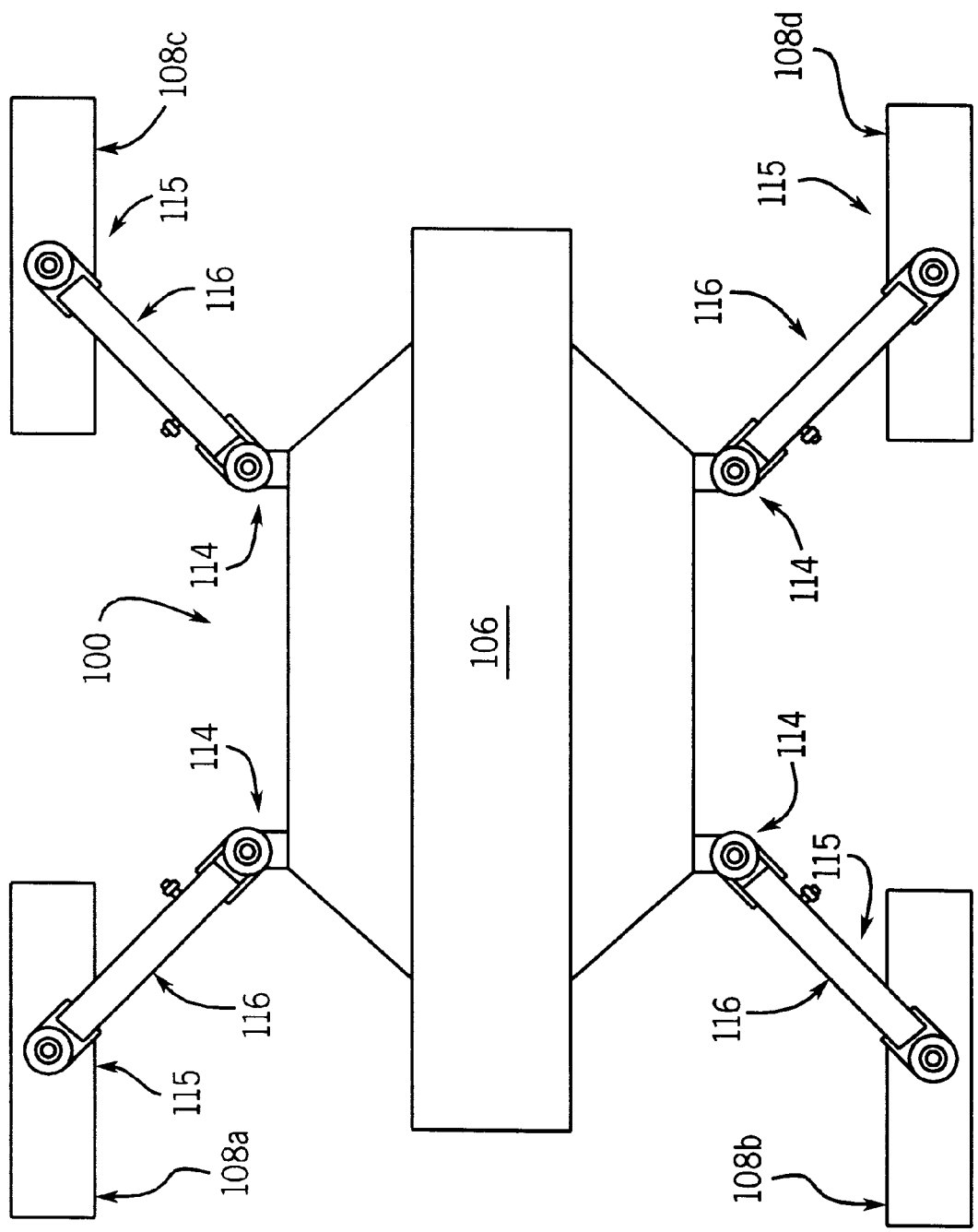
FIG. 3 is a top plan view of the work vehicle of FIG. 1 with extended wheel width.

FIGS. 1, 2, and 3 are views of a chassis 100 of a work vehicle (e.g., construction vehicle, sprayer, tractor, other agricultural vehicle, etc.) according to an exemplary embodiment. For example, FIG. 7 discloses a sprayer 102 having a boom 104 and a chassis 100 according to the exemplary embodiment. The embodiment of FIGS. 1, 2, 3, 4, and 7 is directed to a sprayer. The embodiment of FIG. 5 is directed to a tractor.

Referring to FIGS. 1 and 2, chassis 100 includes a frame 106 coupled to four wheel assemblies 108 via four similar suspension/steering coupling assemblies 110. Wheel assemblies 108 may alternatively be tracks or other ground-engaging devices. Wheel assemblies 108 on opposite sides of frame 106 (e.g., wheel 108a and wheel 108b in FIG. 2) include a distance therebetween (e.g., a wheel width) and a height therebetween. The distance between wheels on opposite sides of frame 106 is measured from analogous points on both wheels, for example, from the center or hub 112 of wheel 108a to the center or hub 112 of 108b. The height between wheels is defined as the distance between the bottom point of the first wheel and an imaginary plane tangent to the bottom point of the second wheel. Wheels on the same side of frame 106 (e.g., wheel 108a and wheel 108c) also include a distance therebetween (e.g., a wheel base) similarly measured and a height therebetween similarly measured. Each of wheel assemblies 108 are driven by fork-mounted hydrostatic motors, though fewer than four wheels may be driven and other motor arrangements (e.g., other electrical and/or mechanical arrangements) are contemplated in alternative embodiments.

With reference to FIG. 1, one of coupling assemblies 110 will now be described. It is understood that coupling assembly 110 is provided on all four (or more) wheels in this exemplary embodiment, but that fewer than all four (e.g., two wheels only) may be provided with coupling assemblies 110. Coupling assembly 110 comprises first, second, and third rotatable assemblies 114, 115, and 116. Each of assemblies 114, 115, and 116 includes at least two members configured to rotate with respect to one another in one of three respective axes 118, 120, and 122a,b. In this exemplary embodiment, rotatable assembly 116 includes a parallelogram lever assembly having upper and lower parallelogram levers 123a and 123b pivotally coupled to rotatable assembly 114 via pins 124, 126 and pivotally coupled to rotatable assembly 115 via pins 128, 130. Thus, axis 122 includes either or both of axes 122a, 122b for rotation. More specifically, an inboard end 132, 134 of each of levers 123a, 123b is pivotally coupled to rotatable assembly 114 and an outboard end 136, 138 of each of levers 123a, 123b is pivotally connected to rotatable assembly 115. Rotatable assembly 114 provides one side of the parallelogram structure and couples levers 123a, 123b to frame 106. Rotatable assembly 115 provides another side of the parallelogram structure and couples levers 123a, 123b to wheel 108.

In this embodiment, rotatable assemblies 114 and 115 are each configured to rotate an axle or shaft within a sleeve. Rotatable assembly 114 includes a sleeve 140 coupled to levers 123a, 123b and coupled pivotally via a disk 144 to an axle 142 (e.g., a helical actuator) which is fixedly mounted to frame 106. Thus, rotatable assembly 114 provides pivotal movement of levers 123a, 123b on a vertical axis 118 of rotation extending through axle 142. Sleeve 140 preferably provides at least 90 degrees of angular displacement of levers 123a, 123b on the vertical axis. Rotatable assembly 114 swings levers 123a, 123b, and, correspondingly, wheel 108, along an arc drawn around axis 118. Rotatable assembly 115 includes a similar sleeve 146 and shaft 147 arrangement. Rotatable assembly 115 includes a sleeve 146 coupled to levers 123a, 123b and coupled pivotally to a shaft 147. Shaft 147 is coupled to wheel assembly 108 for one axis of steering. Rotatable assembly 115 preferably provides at least 120 degrees of turning along a vertical axis 120 of rotation extending through shaft 147. Rotatable assemblies 114 and 115 include helical rotary actuators in this embodiment, and may be of various types such as: a) a hydraulic cylinder; b) a worm-gear type mechanism with a hydraulic motor driving a worm; c) a rack and pinion gear type with a hydraulic cylinder, etc. Rotatable assembly 116 may also be one of these or other similar rotatable assemblies.

Wheel fork 148 is coupled to shaft 147 such that its axis of rotation coincides with axis 120 of rotation of wheel 108. A shield 150 (see FIG. 7) may further be provided to cover a portion of wheel assembly 108 to protect wheel speed sensor 152, prevent the splatter of dirt, to be a carrying body for a hydrostatic motor, etc.

Rotatable assemblies 114, 115, 116 also include respective sensors 154, 155, 156. Sensor 154 is coupled to rotatable assembly 114 and is configured to sense the angular position of rotatable assembly 114 and to provide a position signal representative of the angular position to a control circuit (see FIG. 6). Sensor 155 is coupled to rotatable assembly 115 and is configured to sense the angular position of rotatable assembly 115 and to provide a position signal representative of the angular position to the control circuit (see FIG. 6). A cylinder position sensor 156 is coupled to an actuator 158 which is coupled between sleeve 140 and lever 123b. Sensor 156 is configured to provide a cylinder position signal representative of a position of actuator 158 (e.g., a hydraulic cylinder) to the control circuit (see FIG. 6).

Figure 6:
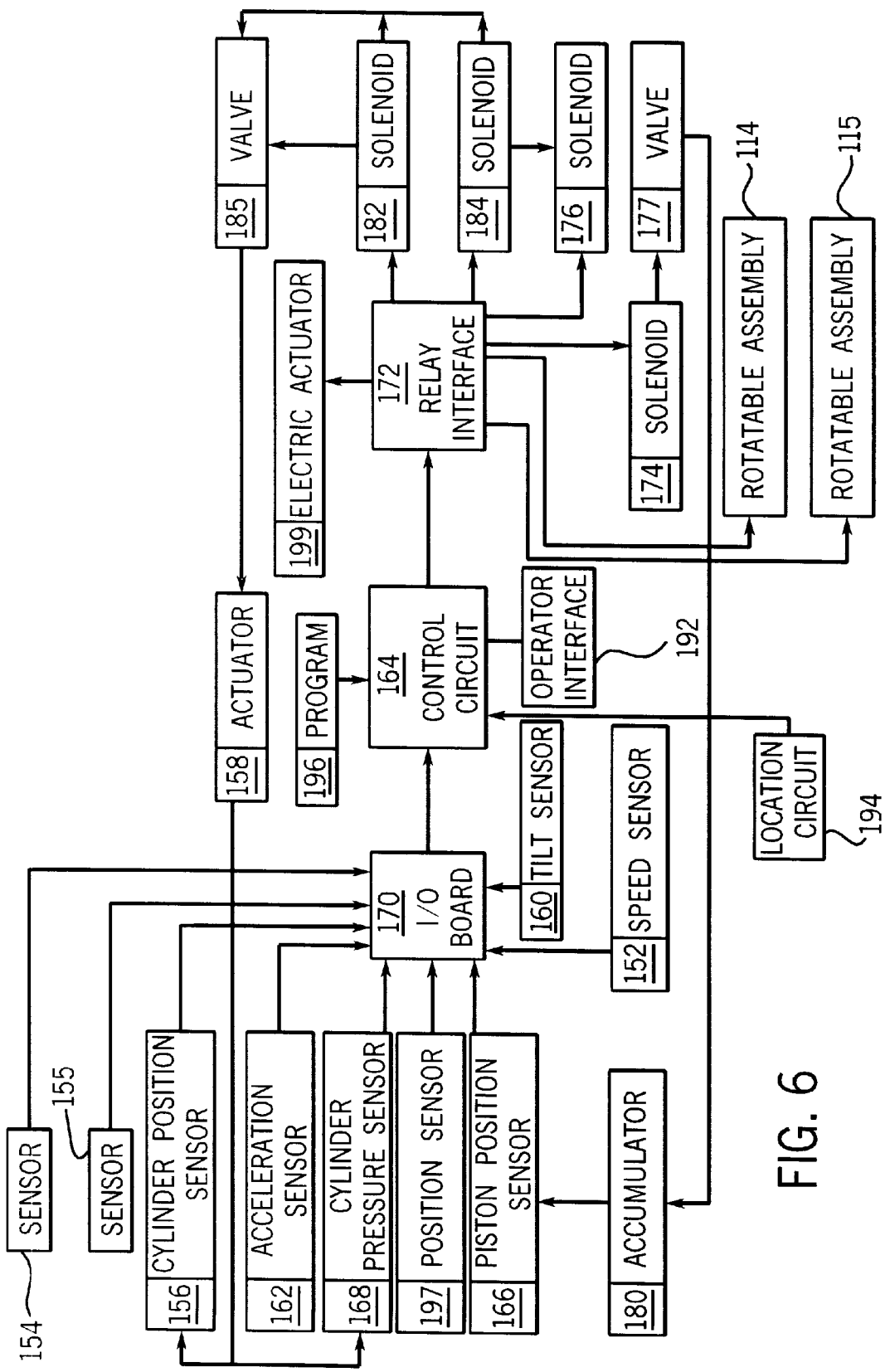
FIG. 6 is a block diagram of the control circuit for the steering and suspension system.
Figure 7:
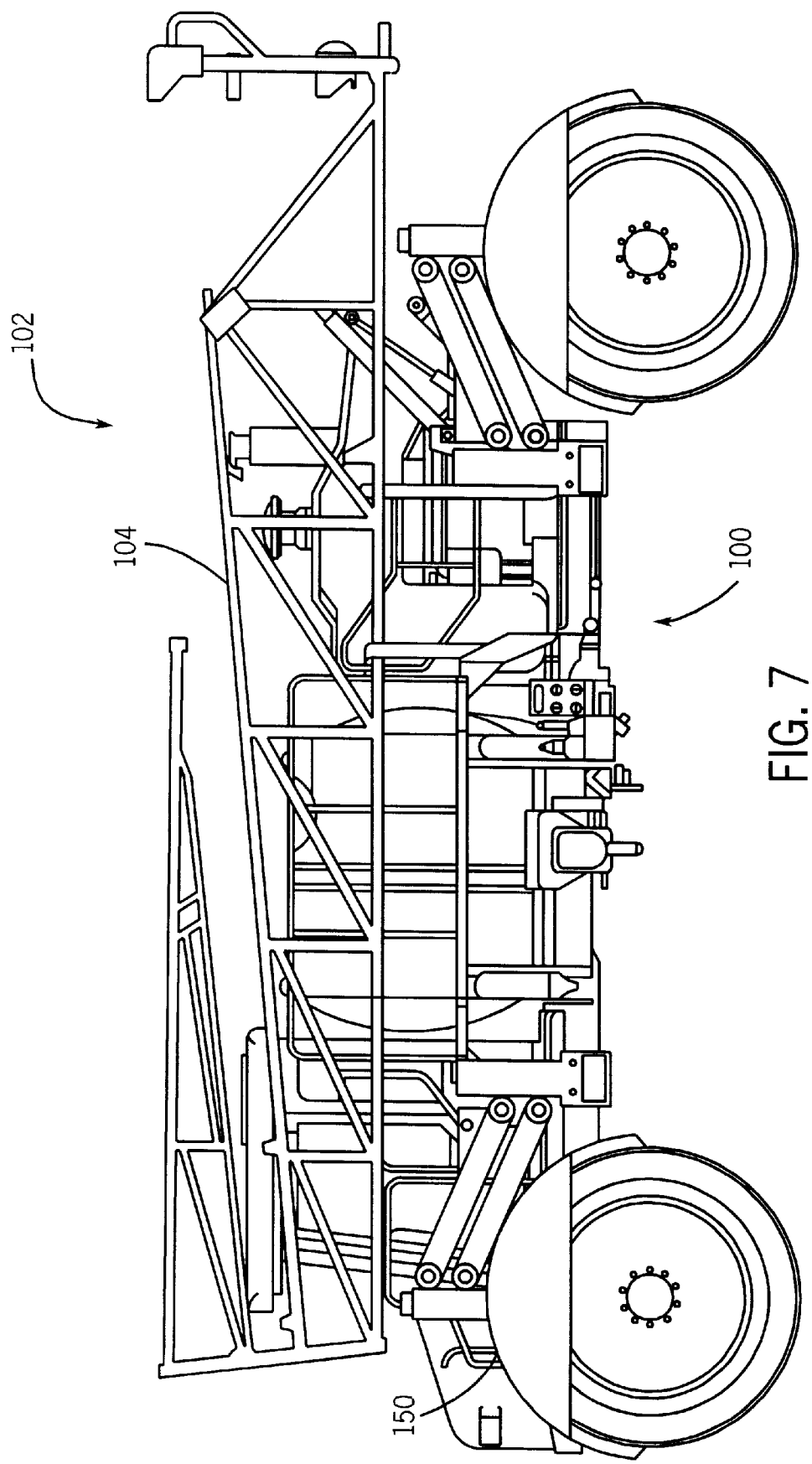
FIG. 7 is a side view of a sprayer having the suspension steering system of FIG. 1.

A wheel speed sensor 152 is coupled to at least one of wheel assemblies 108 and is configured to provide a signal representative of the wheel speed and/or ground speed to the control circuit (see FIG. 6). A tilt sensor 160 is coupled to rotatable assembly 114, but may alternatively be coupled anywhere on chassis 100 or on the work vehicle. Tilt sensor 160 is configured to sense the tilt of the work vehicle with respect to the force of gravity and to provide a signal representative thereof to the control circuit (see FIG. 6). Also, an acceleration sensor 162 is coupled on or near frame 106. Sensor 162 senses the oscillation or acceleration of the work vehicle and provides a signal representative thereof to the control circuit (see FIG. 6).

Lever 123b is also connected through actuator 158 to sleeve 140 for moving wheel assembly 108 in the vertical plane, for example, to change the ground clearance of chassis 100 (i.e., to adjust the vertical position of chassis 100 with respect to the bottom of wheel 108).

Referring now to FIG. 6, a block diagram of a control circuit 164 for chassis 100 is shown. Sensors 152, 154, 155, 156, 160, 162, 166, 168, and 197 are coupled to I/O board 170, which is coupled to or integral with a control circuit 164 (e.g., one or more board computers, microprocessors, microcontrollers, or other digital and/or analog control circuitry). Control circuit 164 is coupled to a relay interface 172, which is coupled to solenoids 174, 176 which drive valve 177 to supply hydraulic fluid to accumulator 180. Control circuit 164 is further coupled to solenoids 182 and 184, which drive valve 185 to supply hydraulic fluid to actuator 158 (e.g., a hydraulic cylinder). The function of valves 177 and 185 will be described in greater detail with reference to FIG. 4 below.

Figure 4:
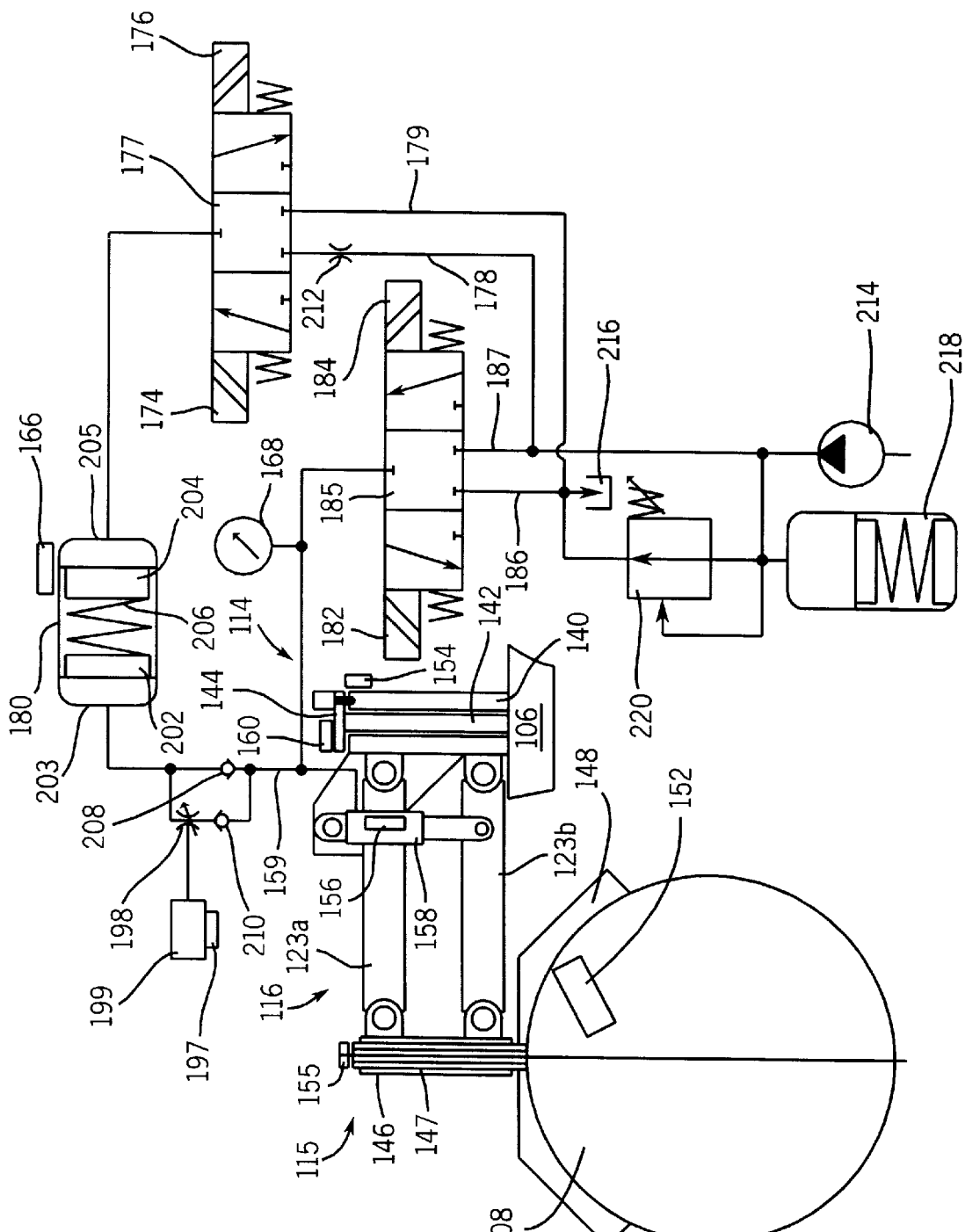
FIG. 4 is a side view of the frame, coupling assembly, and wheel of FIG. 1 with a schematic of the suspension system of the work vehicle.
Figure 5:
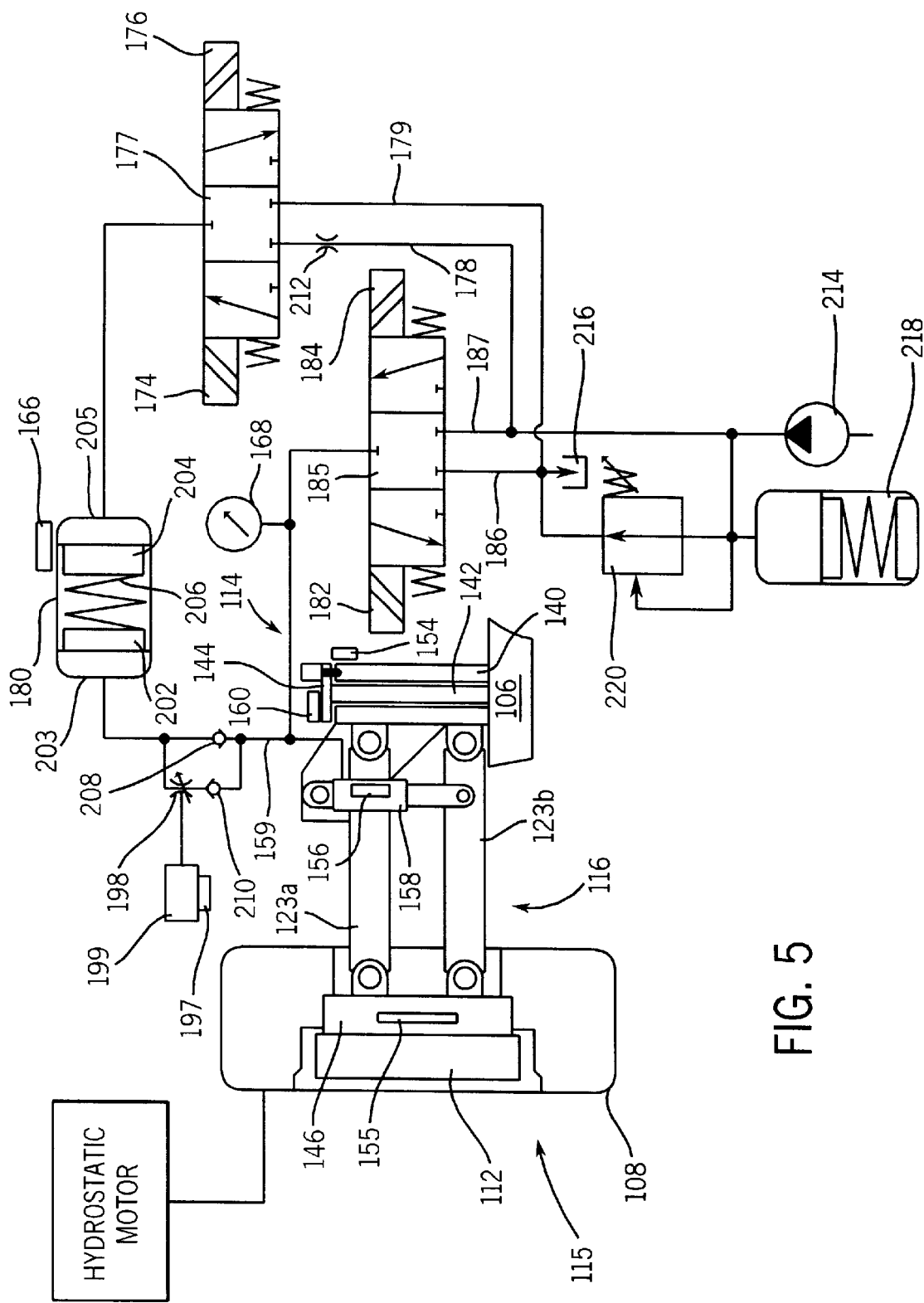
FIG. 5 is a side view of an alternative embodiment of FIG. 4 wherein the vehicle is a tractor.

Control circuit 164 is operative in the embodiments of FIGS. 4 and 5 as steering systems 188, 190 coupled to rotatable assemblies 114, 115, and 116 to provide control signals to assemblies 114, 115, and 116 to steer wheels 108. Control circuit 164 is further coupled to an operator interface 192 comprising various operator input/output devices, including a frame lift switch, a steering joystick or wheel, a display having various pictograms, etc. Operator interface 192 may comprise a WINDOWS-based video screen including touch screen capability.

Control circuit 164 further includes a location circuit 194 (e.g., a Global Positioning System, Differential Global Positioning System, or other location-determining circuit) configured to provide position data to control circuit 164. Control circuit 164 is configured to run a program 196 of work vehicle steering and/or suspension management. Through the use of sensors 152, 154, 155, 156, 160, 162, 166, 168, and 197 and actuator solenoids 174, 176, 182, 184, rotatable assemblies 114, 115, and electric actuator 199, control circuit 164 controls wheel assemblies 108 to perform a number of suspension and turning functions, some of which will now be described.

One feature of the control circuit is the adjustment of wheel width. Control circuit 164 is configured to provide control signals to rotatable assemblies 114, 115 to adjust the distance between wheels 108a, 108b and/or 108c, 108d. There are several ways to change or adjust the distance between wheels 108a, 108b. According to one method, the operator provides input signals to control circuit 164 via operator interface 192 representative of the desired distance between wheels 108a, 108b. Thus, the distance between wheels 108a, 108b can be either increased to a desired distance or decreased to a desired distance. As the distance is increased or decreased, control circuit 164 monitors the distance between wheels 108a, 108b via feedback from position sensors 154 and 155 and calculates any error in the wheel width. Control circuit 164 then adjusts the control signals provided to rotatable assemblies 114, 115 to adjust the positions of the wheels to correct for the error. The wheel base (i.e., distance between wheels 108a and 108c or 108b and 108d) may be adjusted in a similar manner.

The wheel width adjustment can be seen in FIGS. 2 and 3. FIG. 2 shows the wheels having a first, narrow width. FIG. 3 shows the wheels having a second, wider width. Note that in the embodiment of FIGS. 2 and 3, wheel assemblies 108 remain parallel to frame 106, enabling the work vehicle to continue travel in a straight line. Alternatively, wheel assemblies 108 may be orientated for curved travel while the wheel width is widened or narrowed. Note that first rotatable assembly 114 is configured to swing parallelogram assembly 116 away from frame 106. Second rotatable assembly 115 is configured to rotate wheel assembly 108 on a vertical axis. The distance between both front wheels may be adjusted; the distance between both rear wheels may be adjusted; and, the distance between both front wheels and rear wheels may be adjusted. Furthermore, the distance between corresponding front and rear wheels may be adjusted.

The operator may wish to adjust the wheel width and/or wheel base in order to more properly distribute weight on the work vehicle. Thus, the desired wheel positions may be changed as fuel, sprayer fluid, etc. are used up during a spraying process.

A second feature of the control circuit is the steering of the work vehicle. A joystick is provided in this exemplary embodiment as part of operator interface 192. Inclining the joystick to the right or left provides input signals to control circuit 164 which, in turn, provides control signals to rotatable assembly 115 on each of the two front wheels, 108a and 108b, to rotate assembly 115 on each of the two front wheels to correspondingly turn the work vehicle to the right or left. The degree of rotation of the front wheels, 108a, 108b is determined by the joystick inclination (i.e., the greater the inclination, the greater the degree of turning). Furthermore, four-wheel steering, crab steering, and other steering modes may be implemented herewith. The joystick is spring-loaded to return to the neutral position by means of springs mounted in its body. More specifically, analog input signals from the joystick, the wheel speed sensor 152 (FIG. 6), and tilt sensor 160 are provided through I/O board 170 to control circuit 164 where they are processed along with data stored in a steering program stored as program 196. Control circuit 164 then provides control signals through relay interface 172 to the corresponding electric valves to actuate rotatable assemblies 115 which turn wheel assemblies 108 (FIG. 2). As is evident, the steering regime described herein advantageously eliminates customary steering rods and kinematic discrepancies. The steering program also limits the speed of turning, for example, based on the work vehicle speed, wheel width, load, and clearance. This limitation is made to prevent rollover of the work vehicle.

Program 196 may further store automated steering regimes. For example, the exemplary embodiment includes three automated steering regimes: transport steering, field spraying steering, and end row turn steering. During transport steering, two-wheel steering (i.e., front wheel steering) and four-wheel steering (i.e., all wheel coordinated steering) is allowed. The wheels are initially configured generally parallel to frame 106. During field spraying steering, the wheels are initially configured perpendicular to frame 106 (i.e., rotatable assemblies 115 are rotated approximately 90 degrees), and two-wheel steering, four-wheel steering, and crab steering are all allowed. During end row turn steering, two-wheel steering and four-wheel steering are allowed. A single actuation of an operator input device on operator interface 192 rotates all wheels approximately 90 degrees from the field spraying position. The operator then moves the vehicle to the next row. Then a second single actuation of an operator input device rotates all wheels an additional 90 degrees to allow the operator to enter the next row. The operator input device may be the same or different for both operations. Also, the end row turn steering regime includes an option whereby front wheels are rotated inward and rear wheels are rotated outward, such that the work vehicle can rotate on a vertical axis approximately through the center of the work vehicle. Movement of the steering joystick to the left causes rotation counter-clockwise on the axis. Movement of the steering joystick to the right causes rotation clockwise on the axis.

Referring now to FIG. 4, a suspension system for a work vehicle is shown. Actuator 158 is hydraulically coupled to an accumulator 180 with two pistons 202 and 204. A spring 206 is installed between pistons 202 and 204. Spring 206 can be replaced by a gas. The position of piston 204 is adjusted via precharge valve 177 (e.g., a three-position electrohydraulic valve) to correspondingly adjust the preload of spring 206 to avoid too bouncy of a suspension or too hard of a suspension. A cavity 205 of accumulator 180 is connected to a precharge valve 177. Valve 177 is powered by two solenoids 174 and 176, which are coupled to control circuit 164 (see FIG. 6). Pressure line 178 of valve 177 has orifice 212 and is coupled to a pump 214. A relieve line 179 of valve 177 is coupled to a tank 216. A position sensor 166 is coupled to piston 204 to sense the position of piston 204, generate a piston position signal representative of the piston position, and provide the piston position signal to control circuit 164.

Valves 208, 210, and variable orifice 198 work as a shock absorber and are mounted between actuator 158 and cavity 203 of accumulator 180. Variable orifice 198 is coupled to an electric actuator 199 and a position sensor 197. Electric actuator 199 may be controlled by control circuit 164 or directly by an operator to adjust the size of orifice 198 and, accordingly, to adjust the shock absorption of accumulator 180. For example, the size of orifice 198 may be adjusted based on road conditions.

Actuator 158 is coupled to a three-position electrohydraulic valve 185. Valve 185 is powered by two solenoids 182 and 184, which are coupled to control circuit 164 via relay interface 172 (see FIG. 6). Pressure line 187 of valve 185 is connected to pump 214, and a relieve line 186 of valve 185 is coupled to the tank 216. A pressure sensor 168 is installed between valve 185 and line 159 to sense the pressure in the conduit between valve 185 and line 159. Pressure sensor 168 provides a sensed signal to control circuit 164. If the pressure increases above a predetermined pressure level, control circuit 164 will couple cavity 205 with relieve line 179 coupled to hydroaccumulator 218 which prevents damage of the suspension system. Pump 214 is coupled to an adjustable relieve valve 220.

Now referring to FIG. 5, a similar suspension system to that disclosed in FIG. 4 is shown coupled to a tractor wheel 108. Tractor wheel 108 is coupled to sleeve 146 of rotatable assembly 115 at a center hub 112. Thus, rotatable assembly 115 turns wheel 108 from inside wheel 108.

The suspension system of this exemplary embodiment includes an active suspension managed by control circuit 164. This suspension has two regimes of operation: transport mode and working mode. In the transport mode, the active suspension operates as follows. While driving on a road, speed sensor 152, pressure sensor 168, position sensor 166, tilt sensor 160, and cylinder position sensor 156 send signals through I/O board 170 to control circuit 164, where they are averaged (each in its own channel) during a predetermined period of time and then compared with set values in program 196 for a regime of movement (e.g., based on speed and load). Then, the signal of discordance from control circuit 164 is provided in the form of a control signal through relay interface 172 to electrohydraulic valve 177 selectively connecting the cylinder cavity 205 with pump 214 or with tank 216. The process of regulation continues until values from position sensor 166 and pressure sensor 168 are equal to values set in the suspension program. In the case of rough or off-road conditions, when readings from cylinder position sensor 156 exceed readings established by the suspension program (e.g., program 196), the signal of discordance from control circuit 164 is provided in the form of control signals through relay interface 172 to electrohydraulic valve 185 to selectively couple actuator 158 with pump 214 and hydroaccumulator 218 or with tank 216.

For the working mode the active suspension works similarly. The differences are only in the set of values for suspension management in field conditions. In an embodiment wherein the work vehicle is a sprayer, the limiting factors may include permissible boom oscillations for spraying or other implement oscillations. While emptying sprayer tanks, changing clearance or changing the height of spraying, the parameters of suspension (e.g., position of piston 204) will change automatically.

Another feature of the exemplary embodiment is adjusting the clearance of frame 106 from the ground. The operator actuates a button on operator interface 192 to provide input signals to control circuit 164. Control circuit 164 is configured to lift frame 106 up on coupling assemblies 110 by enabling solenoid 184. Solenoid 184 actuates valve 185 to allow hydraulic oil to flow through valve 185 to actuator 158. In response, actuator 158 extends, providing an increased distance between sleeve 140 and lever 123b to move frame 106 upward relative to wheel 108. To reduce clearance, the operator actuates a second button on operator interface 192 to provide input signals to control circuit 164. Control circuit 164 is configured to lower frame 106 via coupling assemblies 110 by enabling solenoid 182. Solenoid 182 actuates valve 185 to remove hydraulic oil from actuator 158. In response, actuator 158 retracts, providing a decreased distance between sleeve 140 and lever 123b to move frame 106 downward relative to wheel 108.

The suspension of the exemplary embodiment further has a "steep-slope" feature such that the work vehicle can traverse along a steep slope while still maintaining the frame substantially horizontal. A horizontal position of the sprayer is sustained manually or automatically when working on slopes or overcoming ditches, or moving down from the road to the field. In the manual regime of work, the operator can press pictograms on operator interface 192 and equalize frame 106 to a required position by means of actuator 158 on each of wheels 108. If the work vehicle is to be used on a slope, it is possible to adjust the frame to the field surface, moving each side of the work vehicle up or down. Thus, the operator presses a pictogram on the operator interface 192 corresponding to a raise or lower of one side or the other of the work vehicle, thereby sending a signal to control circuit 164 through I/O board 170. Control circuit 164 provides control signals through relay interface 172 to valve 185 which in turn opens the oil flow to the corresponding section of the vehicle (e.g., wheel assemblies 108a, 108c or 108b, 108d), thereby moving frame 106 to the desired position. This feature may also be done automatically, whereby control circuit 164 compares readings from tilt sensor 160 to known constants representing a position substantially horizontal with the gravity vector and automatically adjusts the positions of one or more of the wheels until frame 106 is substantially horizontal with respect to gravity.

Figure 8:
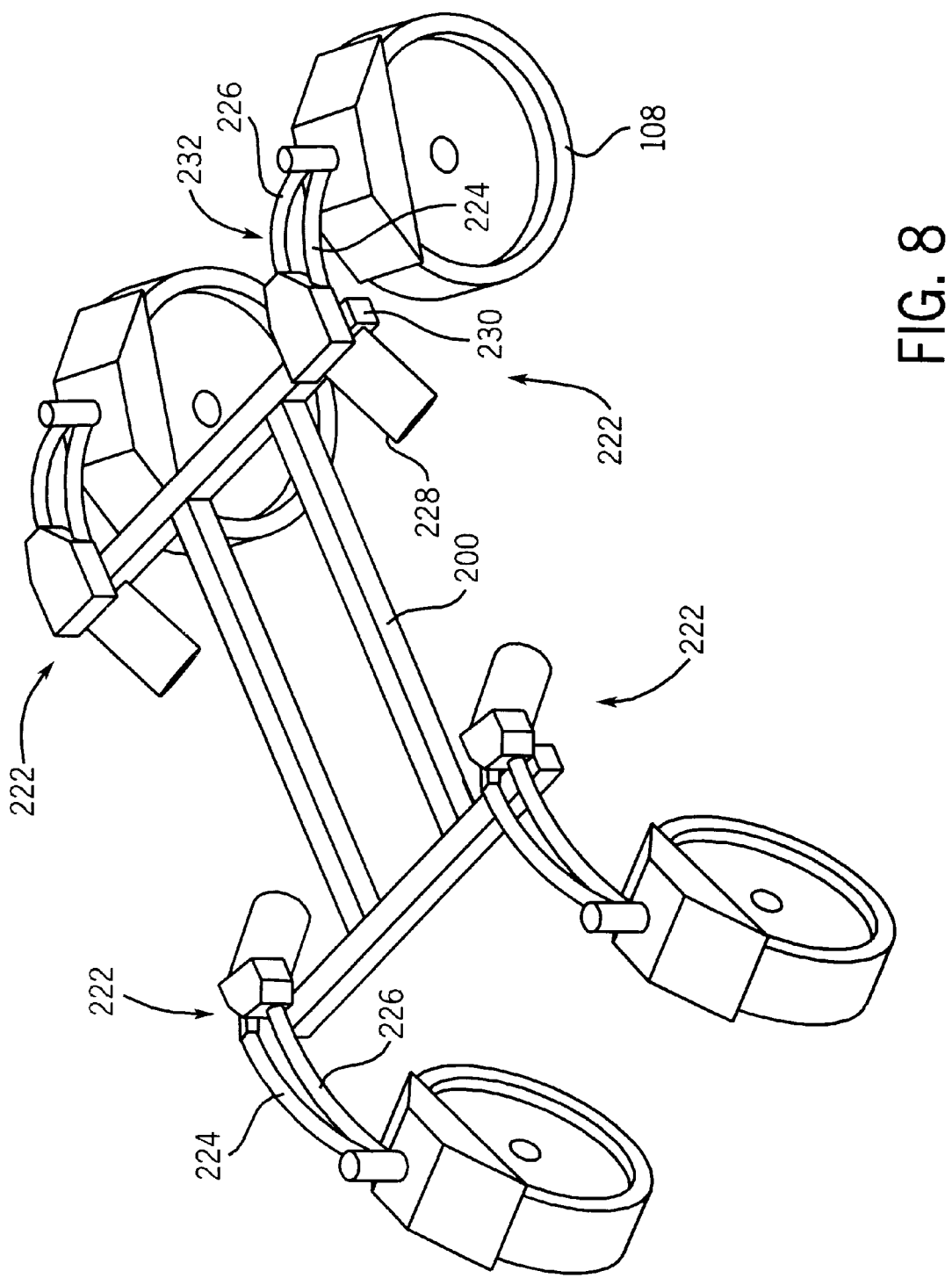
FIG. 8 is a perspective view of an alternative embodiment of the chassis of FIG. 1.
Figure 9:
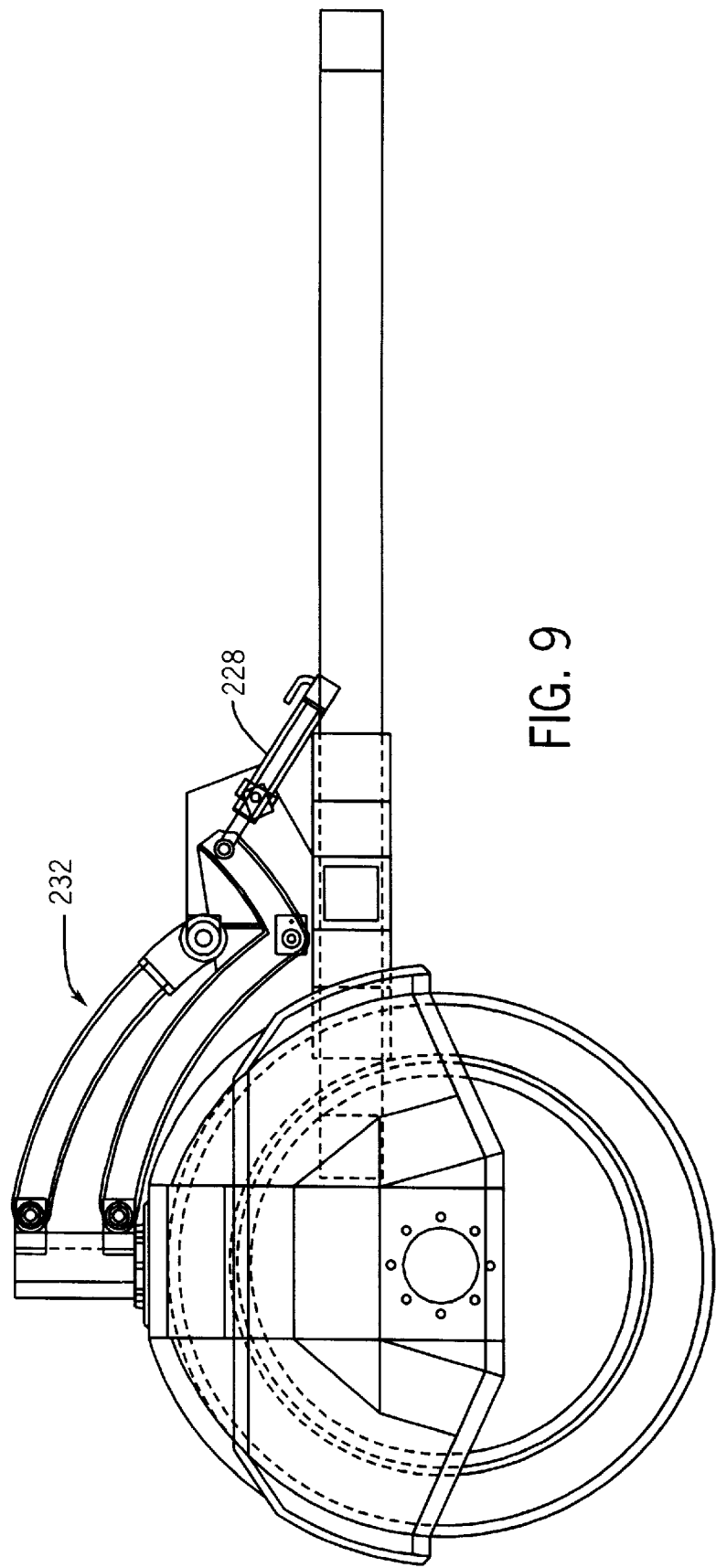
FIG. 9 is a side view sketch of the frame, coupling assembly, and wheel of the alternative embodiment of FIG. 8.

Referring now to FIG. 8, an alternative embodiment of chassis 100 is disclosed showing an alternative arrangement of coupling assemblies 110. In this embodiment, coupling assemblies 222 have arcuate levers 224, 226 instead of the straight levers of the embodiment of FIG. 1. Actuator 158 in the embodiment of FIG. 1 is replaced with an actuator 228 coupling rotatable assembly 230 to arcuate parallelogram assembly 232. Movement of actuator 228, like that of actuator 158, adjusts the ground clearance of frame 200 with respect to wheel assemblies 108 and further provides a suspension system similar to that in the embodiment of FIG. 1. In the configuration shown in FIG. 8, four wheel steering is employed at twenty-two degrees, though a wide range of steering configurations and angles is contemplated. The configuration of actuator 228 and parallelogram assembly 232 is shown in greater detail in FIG. 9.

Figure 10:
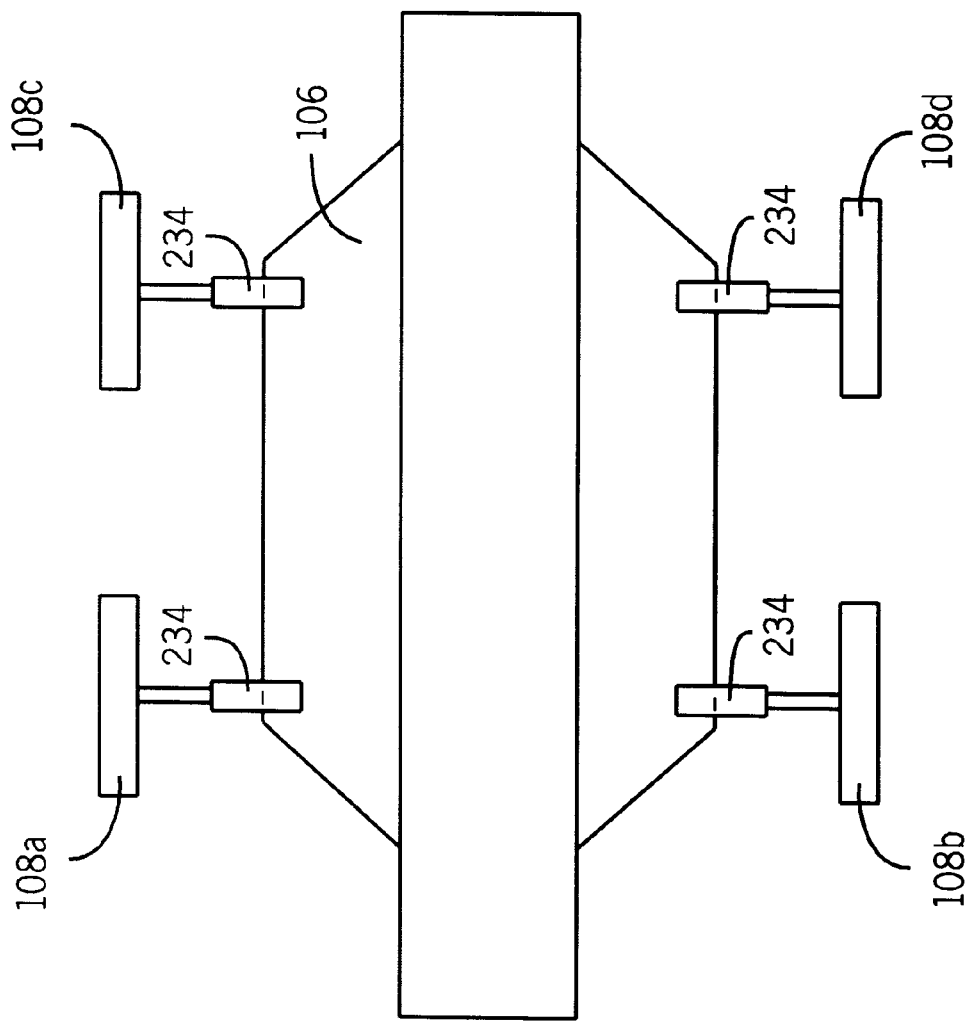
FIG. 10 is a top view of yet another alternative embodiment of the steering system of FIG. 1.

Referring now to FIG. 10, according to another alternative embodiment, each of wheel assemblies 108 may be directly mounted to the rod of an actuator 234 coupled to frame 106. As control circuit 164 provides control signals to actuators 234, wheel assemblies 108 are moved directly closer to or further from the sides of frame 106, thereby adjusting the distance between the wheels. Other configurations for adjusting the distance between the two front wheels, the two rear wheels, and corresponding front and rear wheels are contemplated.

According to yet another feature of the exemplary embodiment of FIG. 1, acceleration sensor 162 senses the acceleration or oscillation of the work vehicle and provides a signal representative thereof to control circuit 164. Control circuit 164 monitors the sensed signal for vehicle resonance. When the work vehicle achieves a certain speed under certain operating conditions (e.g., field surface, vehicle weight distribution, etc.), it may resonate. Control circuit 164 monitors the frequency and amplitude of the sensed signal to determine whether the vehicle is resonating. If it is, control circuit 164 may automatically adjust the wheel base and/or wheel width and/or suspension constants to reduce the resonance. Alternatively, the operator may manually adjust the wheel base and/or wheel width when resonance is detected.

The embodiments and applications of the invention illustrated in the figures and described above are exemplary. It should be understood that these embodiments are offered by way of example only. For example, the coupling assemblies described above may be applied to vehicles having more or less than four wheels (e.g., an eight wheel embodiment). Furthermore, the configuration of the coupling assemblies of the exemplary embodiment of FIG. 1 enables many other control features not specifically described herein, but contemplated nonetheless. For example, control circuit 164 may read a stored prescription map having data regarding desired wheel widths or wheel bases for different portions of the field. As the work vehicle traverses the field, the location circuit (e.g., global positioning system) determines the location of the work vehicle and the control circuit 164 adjusts the wheel width with reference to the prescription map based on the pre-programmed desired wheel width at that location. Accordingly, the present invention is not limited to a particular embodiment, but extends to various modifications that nevertheless fall within the scope of the appended claims.

What is claimed is:

1. A work vehicle steering system for a work vehicle having a frame, a plurality of wheels, and a coupling assembly coupled to at least one of the wheels, the coupling assembly comprising:

a first rotatable assembly coupled to the frame and configured to rotate on a first axis;

a second rotatable assembly coupled to the first rotatable assembly and configured to rotate on a second axis;

a third rotatable assembly coupled between the second rotatable assembly and the wheel and configured to rotate on a third axis, whereby the coupling assembly provides the wheel with three degrees of movement;

a control circuit coupled to at least one of the first, second, and third rotatable assemblies configured to rotate at least one of the first, second, and third assemblies on their respective axes; and first, second, and third position sensors coupled to the first, second, and third rotatable assemblies, respectively, each position sensor configured to provide a position signal to the control circuit representative of the position of the respective rotatable assembly.

2. The work vehicle steering system of claim 1, wherein the second rotatable assembly comprises a parallelogram assembly configured to rotate on first and second pins, the second axis extending through one of the first and second pins.

3. The work vehicle steering system of claim 1, the coupling assemblies further comprising an actuator coupled to the second rotatable assembly, the actuator configured to adjust the height of the wheel with respect to the frame and further configured to provide suspension to the wheel.

4. The work vehicle steering system of claim 2, wherein the first and third rotatable assemblies rotate on vertical axes.

5. The work vehicle steering system of claim 1, wherein the control circuit is configured to adjust at least one of the distance and the height between wheels on opposite sides of the work vehicle.

6. The work vehicle steering system of claim 1, wherein the control circuit is configured to adjust at least one of the distance and the height between wheels on the same side of the work vehicle.

7. The work vehicle steering system of claim 1, further comprising an accelerometer coupled to the work vehicle configured to sense the acceleration of the work vehicle and provide an acceleration signal to the control circuit, wherein the control circuit is configured to monitor the resonance of the work vehicle based on the acceleration signal and to adjust one of wheel base, wheel width, and suspension constants to reduce the resonance.

8. The work vehicle steering system of claim 1, further comprising a tilt sensor coupled to the work vehicle configured to sense the tilt of the work vehicle with respect to gravity and to provide a tilt signal to the control circuit, the control circuit configured to adjust at least one of the three rotatable assemblies to maintain the frame of the work vehicle in a substantially horizontal position with respect to a gravity vector.

9. The work vehicle steering system of claim 1, the control circuit configured to actuate the second rotatable assembly of each wheel to adjust the clearance of the work vehicle with respect to the ground.

10. The work vehicle steering system of claim 1, the coupling assembly further comprising a hydrostatic motor configured to drive the wheel.

11. A work vehicle steering system for a work vehicle having a frame, a plurality of wheels, and a coupling means coupled to each of the wheels, the coupling means each comprising:

first means coupled to the frame for rotating on a first axis;

second means coupled to the first means for rotating on a second axis;

third means coupled between the second means and the wheel for rotating on a third axis, whereby the coupling means provides the wheel with three degrees of movement;

a control means for rotating the first means, second means, and third means on their respective axes; and an accelerometer means coupled to the work vehicle for sensing the acceleration of the work vehicle and providing an acceleration signal to the control means, wherein the control means monitors the resonance of the work vehicle based on the acceleration signal and adjusts one of the wheel base and the wheel width to reduce the resonance.

12. The work vehicle steering system of claim 11, wherein the second means comprises a parallelogram means for rotating on first and second pins, the second axis extending through one of the first and second pins.

13. The work vehicle steering system of claim 11, wherein the first and third means rotate on vertical axes.

14. The work vehicle steering system of claim 11, wherein the control means adjusts the distance between wheels on opposite sides of the work vehicle.

15. The work vehicle steering system of claim 11, wherein the control means adjusts the distance between wheels on the same side of the work vehicle.

16. The work vehicle steering system of claim 11, further comprising a tilt sensor means for sensing the tilt of the work vehicle with respect to gravity and providing a tilt signal to the control means, the control means for adjusting at least one of the first, second, and third means to maintain the frame of the work vehicle in a substantially horizontal position with respect to a gravity vector.

17. A work vehicle steering system for a work vehicle having a frame, a plurality of wheels, and a coupling assembly coupled to at least one of the wheels, the coupling assembly comprising:

a first rotatable assembly coupled to the frame and configured to rotate on a first axis;

a second rotatable assembly coupled to the first rotatable assembly and configured to rotate on a second axis;

a third rotatable assembly coupled between the second rotatable assembly and the wheel and configured to rotate on a third axis, whereby the coupling assembly provides the wheel with three degrees of movement;

a control circuit coupled to at least one of the first, second, and third rotatable assemblies configured to rotate at least one of the first, second, and third assemblies on their respective axes; and an accelerometer coupled to the work vehicle configured to sense the acceleration of the work vehicle and provide an acceleration signal to the control circuit, wherein the control circuit is configured to monitor the resonance of the work vehicle based on the acceleration signal and to adjust one of wheel base, wheel width, and suspension constants to reduce the resonance.

18. The work vehicle steering system of claim 17, wherein the control circuit is configured to adjust the wheel base to reduce the resonance.

19. The work vehicle steering system of claim 17, wherein the control circuit is configured to adjust the wheel width to reduce the resonance.

20. The work vehicle steering system of claim 17, wherein the control circuit is configured to adjust the suspension constants to reduce the resonance.

* * * * *